United States Patent
Sugioka

(10) Patent No.: US 10,608,681 B2
(45) Date of Patent: Mar. 31, 2020

(54) TRANSMISSION DEVICE AND COMMUNICATION SYSTEM

(71) Applicant: Sony Semiconductor Solutions Corporation, Kanagawa (JP)

(72) Inventor: Tatsuya Sugioka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/487,559

(22) PCT Filed: Feb. 15, 2018

(86) PCT No.: PCT/JP2018/005223
§ 371 (c)(1),
(2) Date: Aug. 21, 2019

(87) PCT Pub. No.: WO2018/159304
PCT Pub. Date: Sep. 7, 2018

(65) Prior Publication Data
US 2019/0379411 A1 Dec. 12, 2019

(30) Foreign Application Priority Data
Mar. 3, 2017 (JP) .................. 2017-039992

(51) Int. Cl.
*H04B 1/04* (2006.01)
(52) U.S. Cl.
CPC ...................... *H04B 1/04* (2013.01)
(58) Field of Classification Search
CPC ................ H04B 1/04; H04B 1/0483
See application file for complete search history.

(56) References Cited

U.S. PATENT DOCUMENTS

| 8,947,840 B1 | 2/2015 | Milirud et al. |
| 2003/0006856 A1 | 1/2003 | Miller |
| 2004/0155675 A1 | 8/2004 | Zerbe et al. |
| 2014/0254172 A1 | 9/2014 | Wang He |
| 2015/0029623 A1 | 1/2015 | Yang et al. |

(Continued)

FOREIGN PATENT DOCUMENTS

| JP | 2015-507879 A | 3/2015 |
| JP | 2015-228554 A | 12/2015 |

OTHER PUBLICATIONS

Extended European Search Report dated Jan. 31, 2020 for corresponding European Application No. 18760763.5.

*Primary Examiner* — Nguyen T Vo
(74) *Attorney, Agent, or Firm* — Michael Best & Friedrich LLP

(57) ABSTRACT

A transmission device according to an embodiment of the present disclosure includes three output terminals that are arranged in one line and three sets of inductor elements and ESD protection elements that are provided for the respective output terminals. The three output terminals are respectively coupled to three transmission paths. The three sets of the inductor elements and the ESD protection elements are arranged in a non-orthogonal direction with respect to a direction in which the three output terminals are arranged. The transmission device further includes a driver circuit that outputs three actuation signals to the respective three output terminals through the respective three sets of the inductor elements and the ESD protection elements.

12 Claims, 14 Drawing Sheets

(56) References Cited

U.S. PATENT DOCUMENTS

2015/0041883 A1* 2/2015 Kimura ............ H01L 29/66659
                                                    257/328
2018/0006014 A1* 1/2018 Mayer .................... H02H 3/445

* cited by examiner

[ FIG. 1 ]
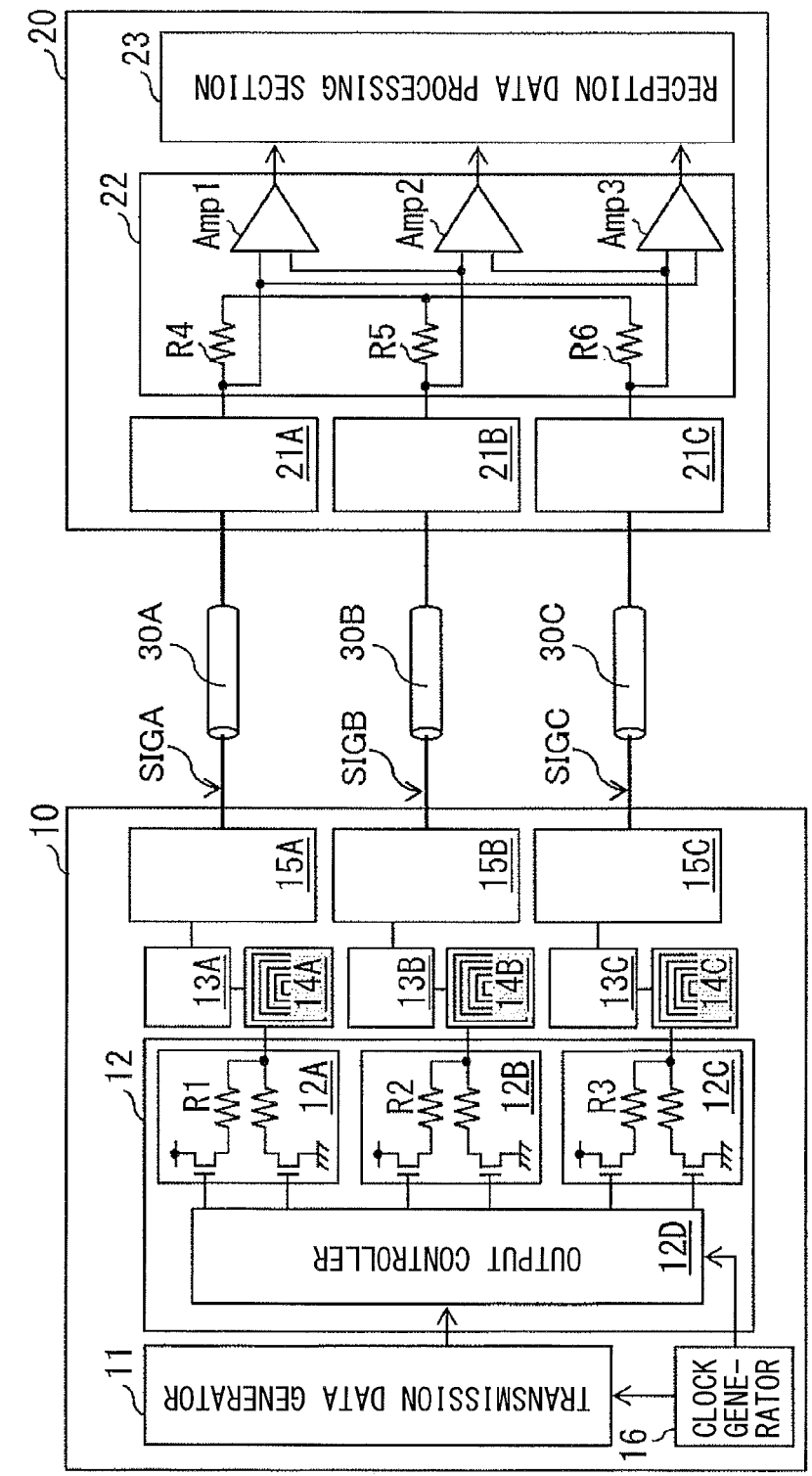

[ FIG. 2 ]
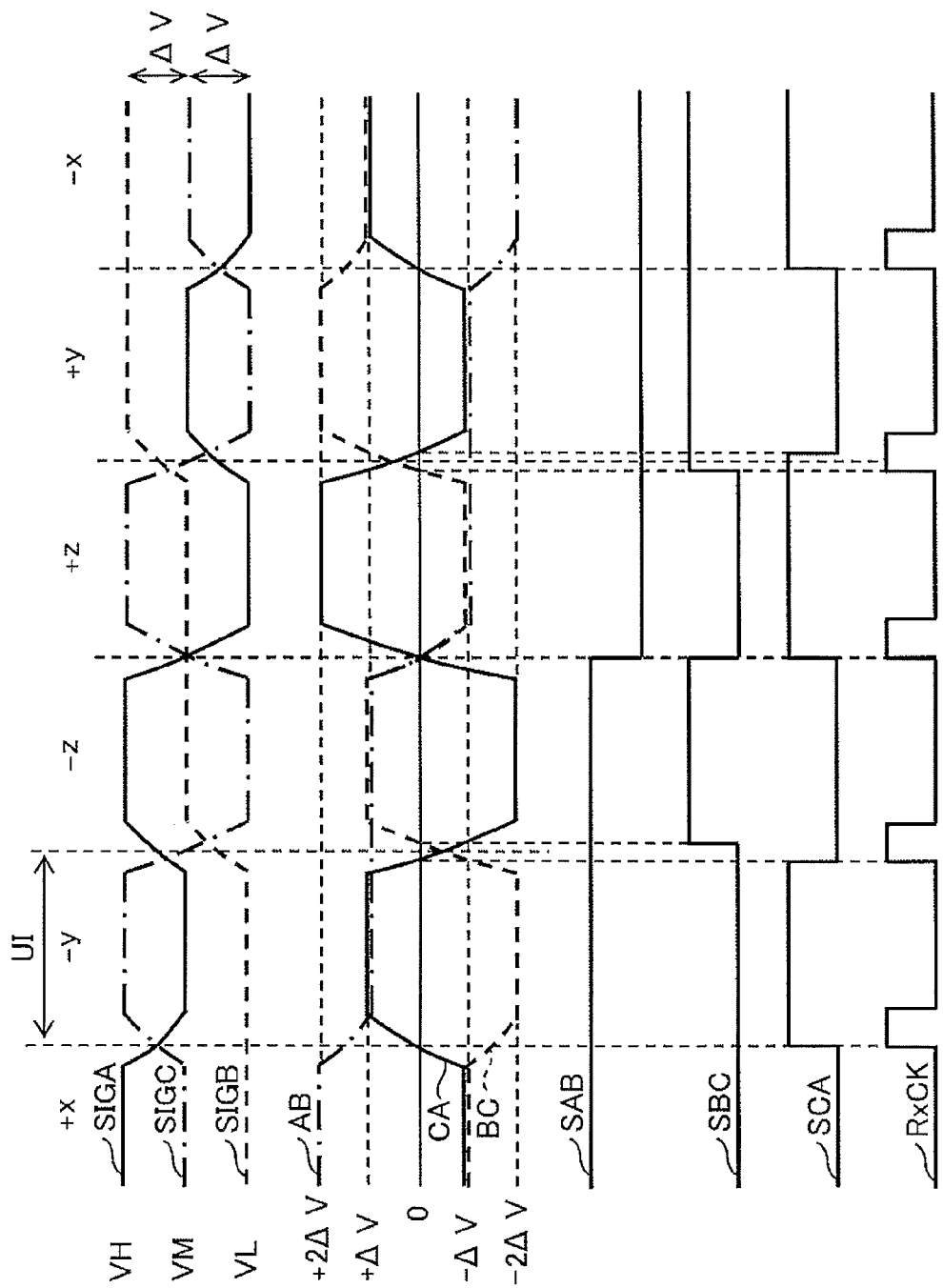

[ FIG. 3 ]
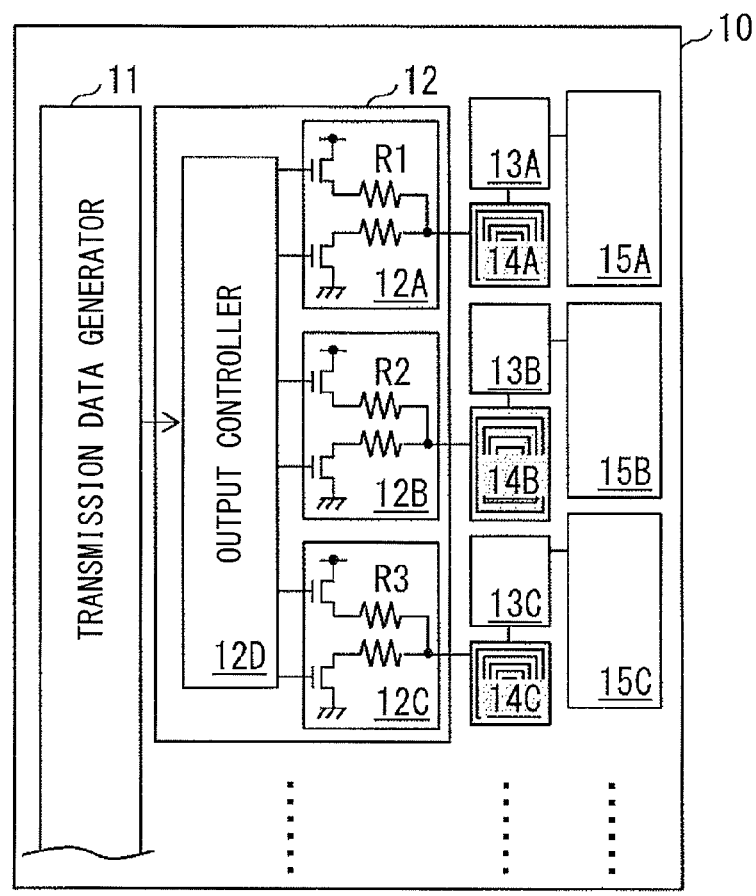

[ FIG. 4 ]

| | STANDARD | COMBINATION A | COMBINATION B | COMBINATION C |
|---|---|---|---|---|
| OUTPUT RESISTANCE [Ω] OF DRIVER 12A | 60 | 54 | 60 | 60 |
| OUTPUT RESISTANCE [Ω] OF DRIVER 12B | 60 | 60 | 54 | 60 |
| OUTPUT RESISTANCE [Ω] OF DRIVER 12C | 60 | 60 | 60 | 54 |
| EYE PATTERN | AMPLITUDE [mV] | AMPLITUDE [mV] | AMPLITUDE [mV] | AMPLITUDE [mV] |
| WORST | 37.0 | 37.0 | 41.6 | 37.7 |
| SECOND WORST | 40.6 | 40.5 | 42.1 | 40.5 |
| THIRD WORST | 42.1 | 41.3 | 42.2 | 42.1 |
| FOURTH WORST | 42.6 | 42.4 | 42.3 | 42.6 |
| FIFTH WORST | 42.6 | 42.7 | 42.4 | 42.6 |
| SIXTH WORST | 42.7 | 42.9 | 42.7 | 42.8 |
| SEVENTH WORST | 42.9 | 43.1 | 42.8 | 42.9 |
| EIGHTH WORST | 43.2 | 42.2 | 43.2 | 43.2 |
| NINTH WORST | 43.2 | 43.5 | 43.5 | 43.4 |
| TENTH WORST | 43.4 | 44.0 | 43.6 | 43.4 |
| DIFFERENCE (VARIATION) | 6.4 | 7.0 | 2.0 | 5.7 |
| WHETHER TRANSMISSION CHARACTERISTICS ARE ACCEPTABLE OR NOT | NOT ACCEPTABLE | NOT ACCEPTABLE | ACCEPTABLE | NOT ACCEPTABLE |

[ FIG. 5 ]
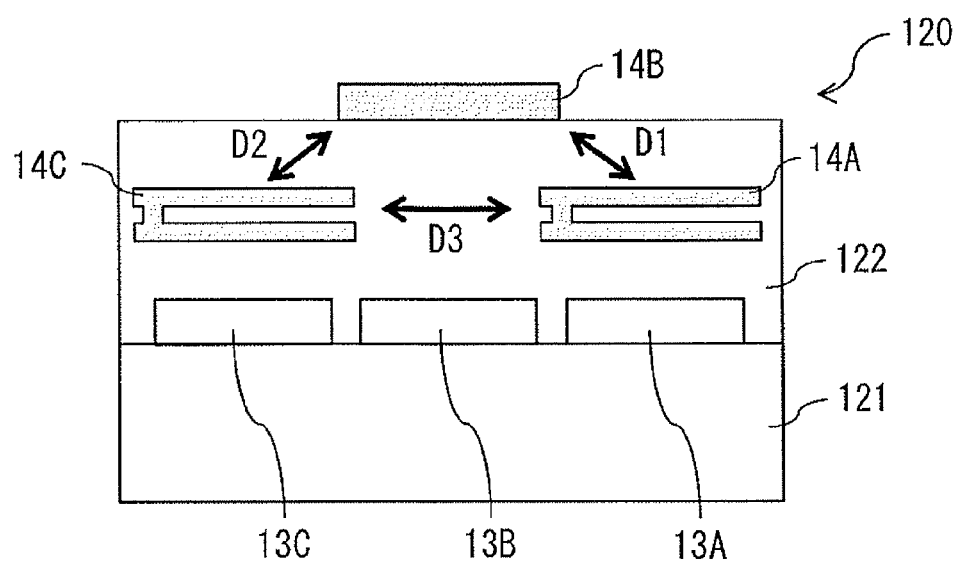

[FIG. 6]
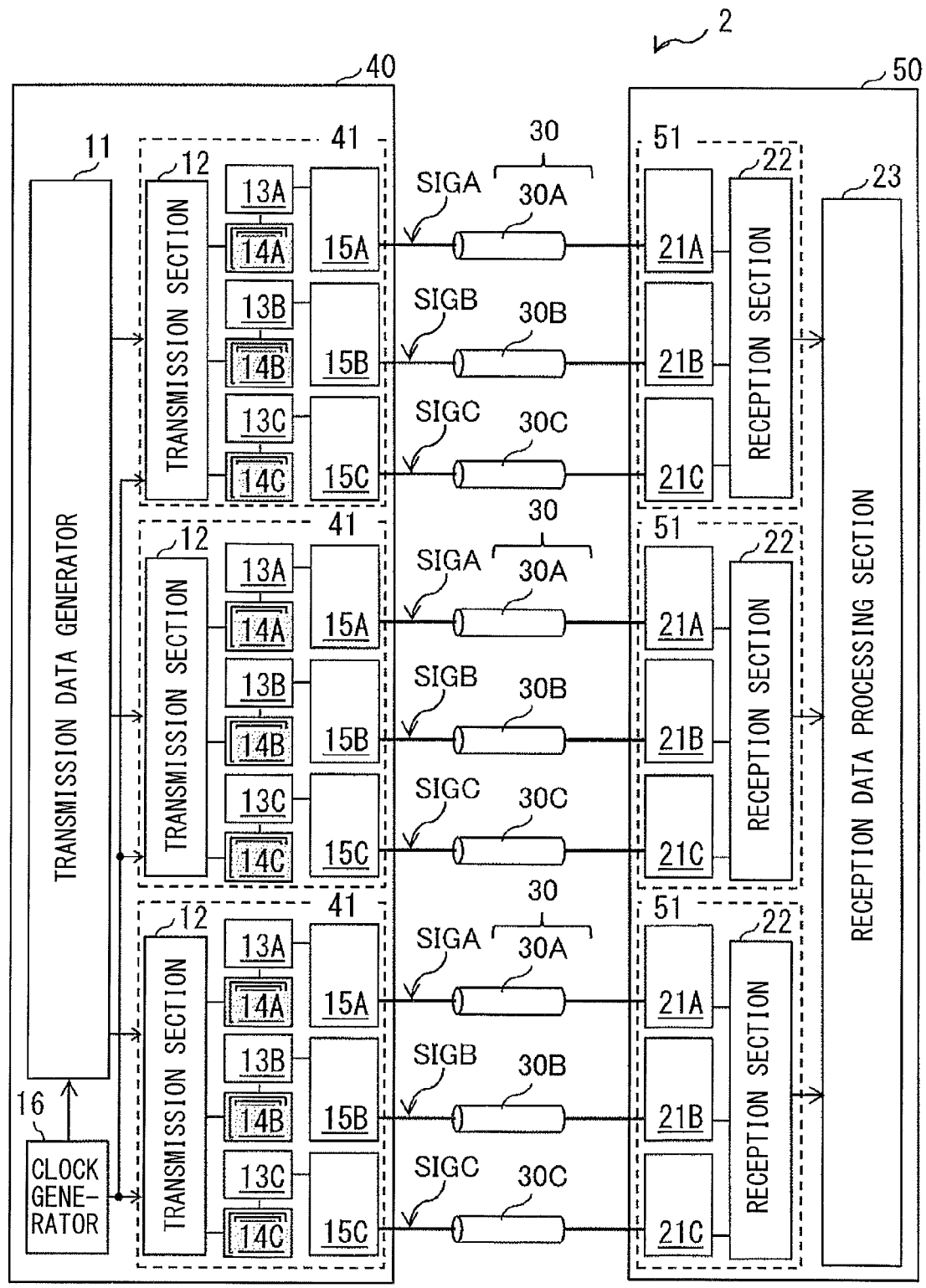

[ FIG. 7 ]
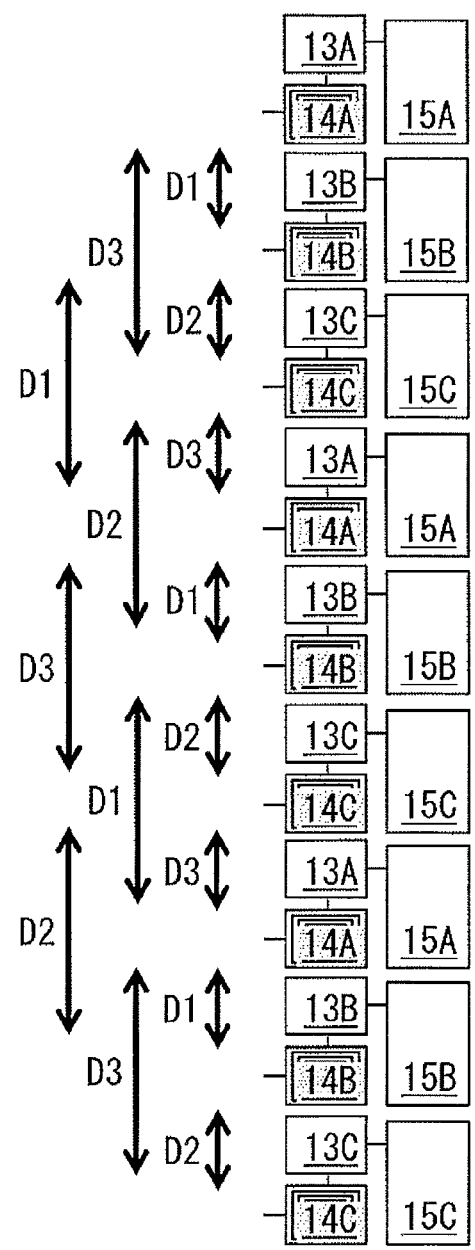

[ FIG. 8 ]
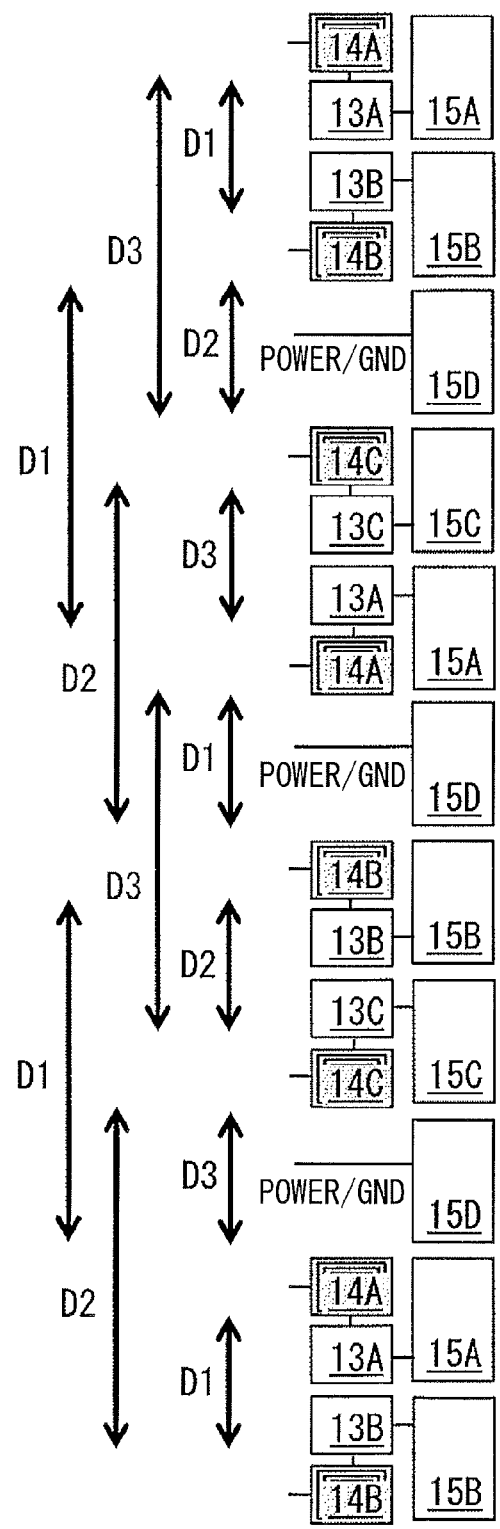

[ FIG. 9 ]
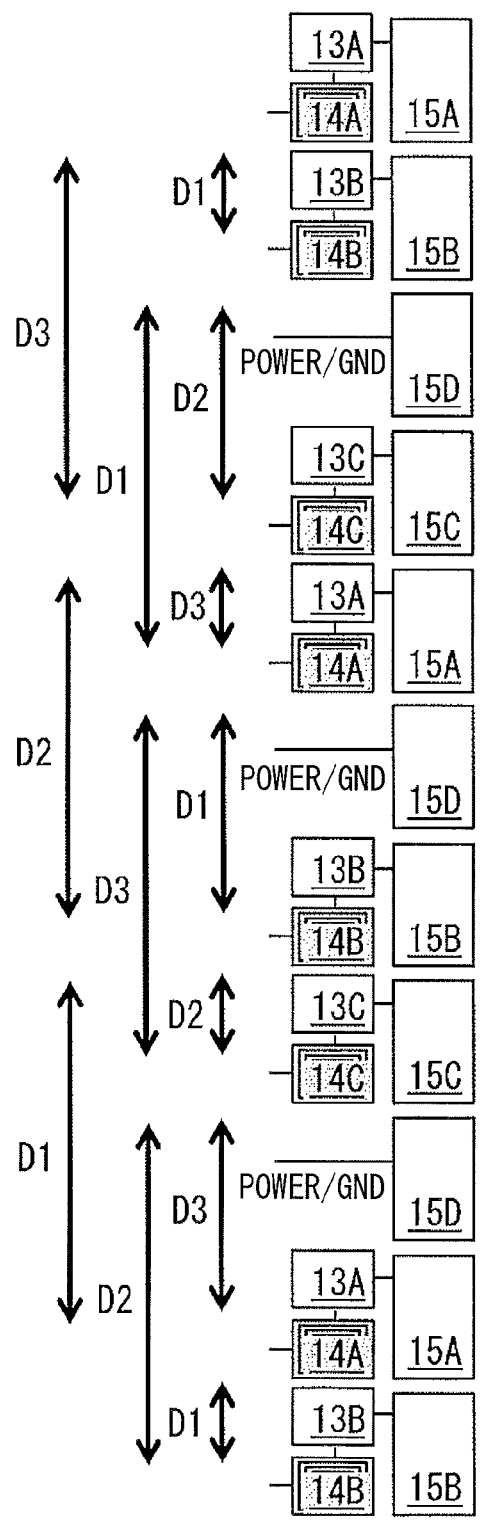

[ FIG. 10 ]
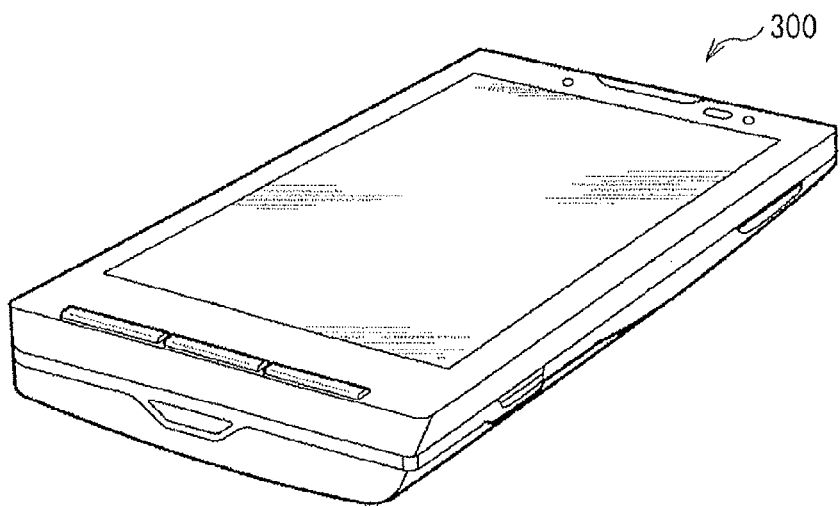

[FIG. 11]
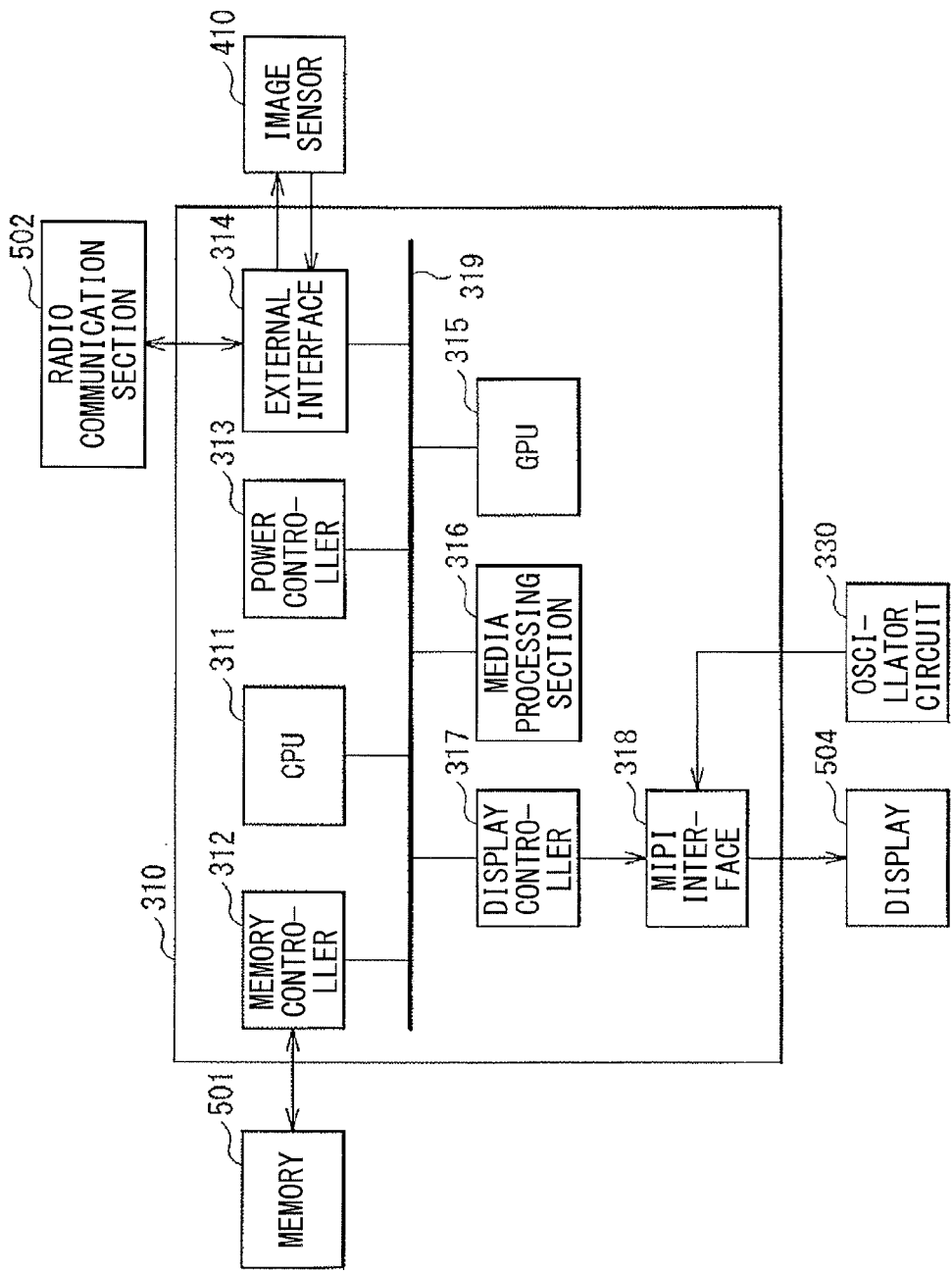

[ FIG. 12 ]
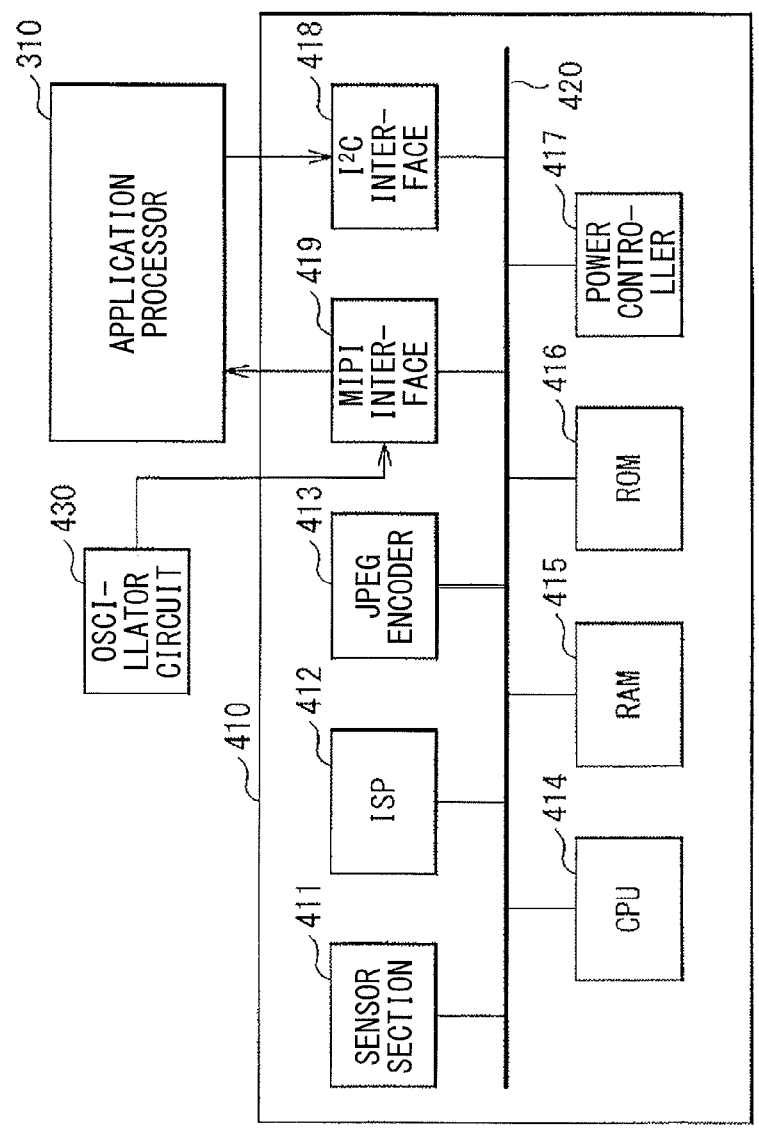

[ FIG. 13 ]
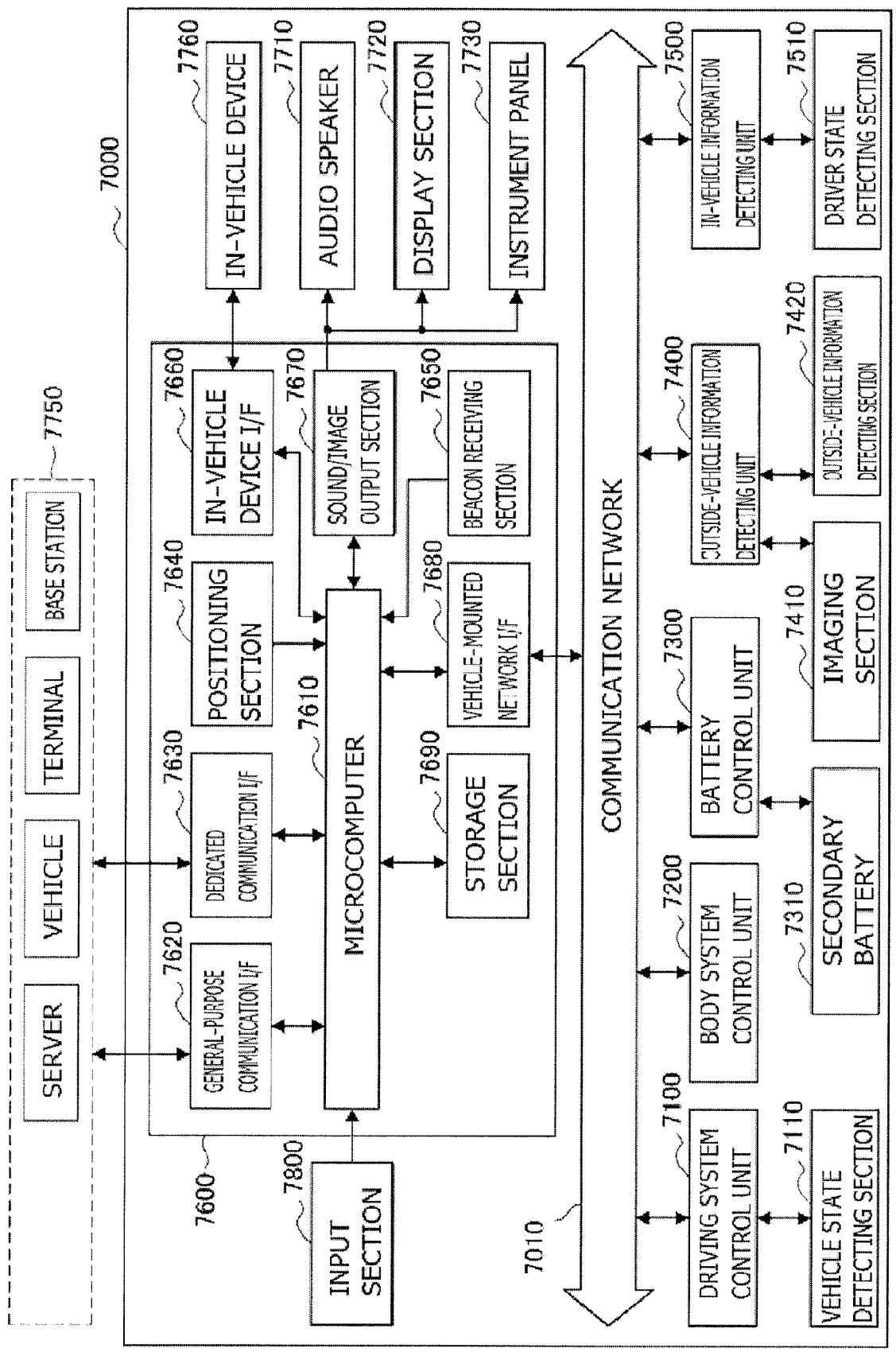

[ FIG. 14 ]
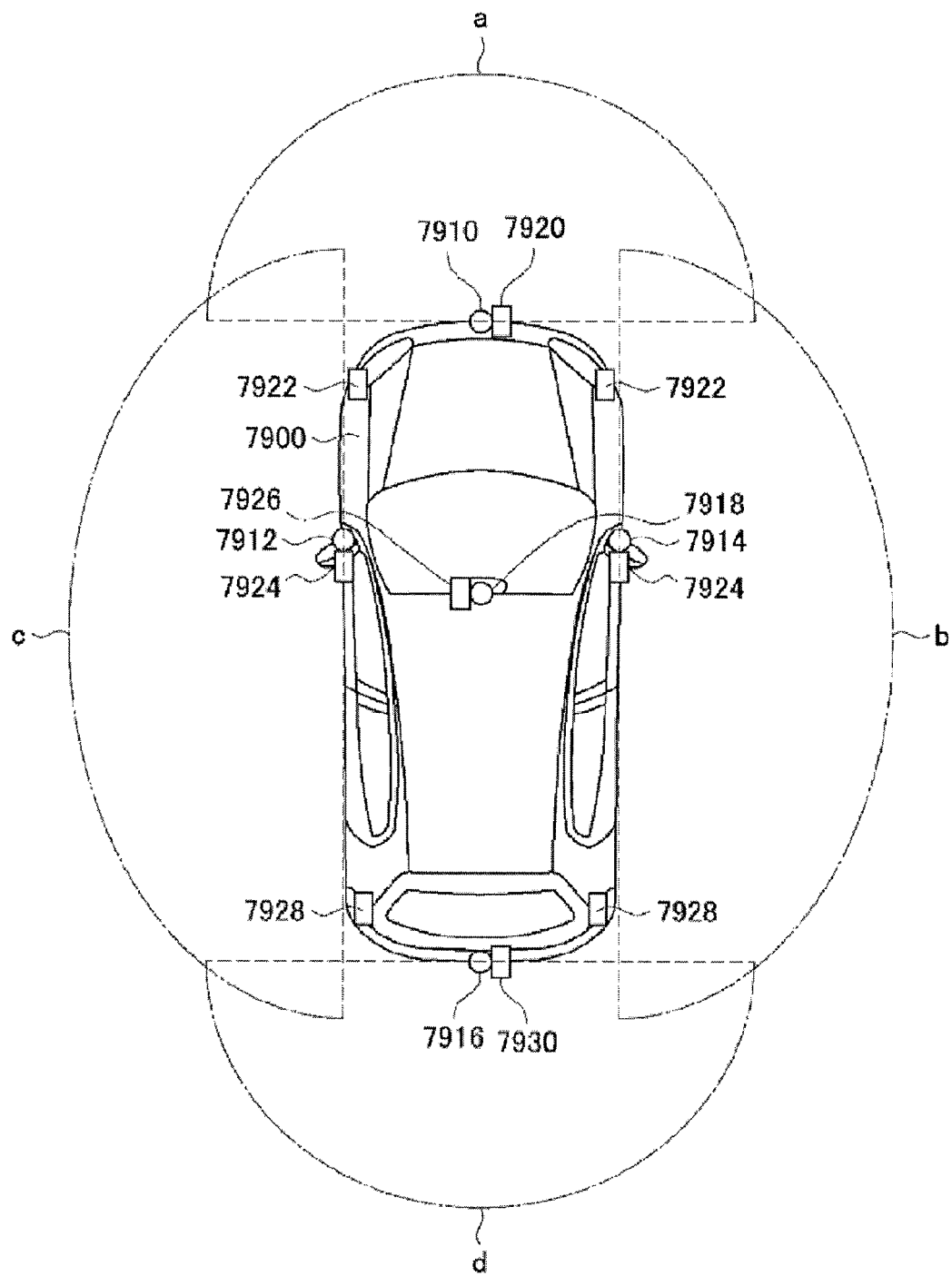

TRANSMISSION DEVICE AND COMMUNICATION SYSTEM

TECHNICAL FIELD

The present disclosure relates to a transmission device that transmits a signal and a communication system that transmits and receives a signal.

BACKGROUND ART

In association with high functionality and multi-functionality of electronic apparatuses in recent years, the electronic apparatuses are mounted with various devices such as a semiconductor chip, a sensor, and a display device. A lot of pieces of data are exchanged between these devices, and the amount of such data has been increased with high functionality and multi-functionality of the electronic apparatuses. Accordingly, the data are often exchanged with use of a high-speed interface. The high-speed interface is able to transmit and receive data at several Gbps, for example.

Various techniques have been disclosed for enhancing communication performance in a high-speed interface. For example, PTL 1 discloses a communication system that transmits three differential signals using three transmission paths.

CITATION LIST

Patent Literature

PTL 1: Japanese Unexamined Patent Application Publication No. 2015-228554

SUMMARY OF THE INVENTION

However, in the field of communication systems, it is desirable to enhance communication performance. Accordingly, it is desirable to provide a transmission device and a communication system that make it possible to enhance communication performance.

A first transmission device according to an embodiment of the present disclosure includes the following three structural elements.
(A1) three output terminals that are arranged in one line and that are respectively coupled to three transmission paths
(A2) three sets of inductor elements and electrostatic discharge (ESD) protection elements that are provided for the respective output terminals and are arranged in a non-orthogonal direction with respect to a direction in which the three output terminals are arranged
(A3) a driver circuit that outputs three actuation signals to the respective three output terminals through the respective three sets of the inductor elements and the ESD protection elements A first communication system according to an embodiment of the present disclosure includes a transmission device and a reception device, the transmission device transmitting three actuation signals through three transmission paths. In the first communication system, the transmission device includes the following three structural elements.
(B1) three output terminals that are arranged in one line and that are respectively coupled to three transmission paths
(B2) three sets of inductor elements and ESD protection elements that are provided for the respective output terminals and are arranged in a non-orthogonal direction with respect to a direction in which the three output terminals are arranged, and
(B2) a driver circuit that outputs three actuation signals to the respective three output terminals through the respective three sets of the inductor elements and the ESD protection elements In the first transmission device and the first communication system according to an embodiment of the present disclosure, one set of an inductor element and an ESD protection element is provided for each output terminal. This covers a weakness with respect to ESD caused by enhancement in communication performance and also improves transmission characteristics of the first transmission device. Moreover, the inductor element and the ESD protection element included in each set are arranged in a non-orthogonal direction with respect to a direction in which the three output terminals are arranged. Compared to a case where the inductor element and the ESD protection element included in each set are arranged in an orthogonal direction with respect to the direction in which the three output terminals are arranged, the arrangement in the non-orthogonal direction makes it possible to cause a region for forming each inductor element to have a square shape or a shape close to a square, and further makes it easier to make an area of the region for forming each inductor element larger. As a result, for example, it is possible to increase the number of windings of each inductor element. Additionally, for example, it is possible to increase the width of the wiring, which makes it possible to increase a Q value of an inductor. Further, for example, it is possible to cause each inductor element to have a square shape, a hexagonal shape, an octagonal shape, and the like. In this manner, the first transmission device and the first communication system according to an embodiment of the present disclosure enable the transmission characteristics of the first second transmission device and a second transmission device to be improved, compared to the case where the inductor element and the ESD protection element included in each set are arranged in the orthogonal direction with respect to the direction in which the three output terminals are arranged.

A second transmission device according to an embodiment of the present disclosure includes a plurality of transmission interface sections. Each transmission interface section includes the following three structural elements.
(B1) three output terminals that are arranged in one line and that are respectively coupled to three transmission paths
(B2) three sets of inductor elements and ESD protection elements that are provided for the respective output terminals and are arranged in a non-orthogonal direction with respect to a direction in which the three output terminals are arranged
(B3) a driver circuit that outputs three actuation signals to the respective three output terminals through the respective three sets of the inductor elements and the ESD protection elements A second communication system according to an embodiment of the present disclosure includes a transmission device and a reception device, the transmission device transmitting three actuation signals through a plurality of transmission path groups for each of the transmission path groups, the transmission path groups each including one set of three transmission paths. In the second communication system, the transmission device includes a plurality of transmission interface sections allocated to the respective transmission path groups. Each of the transmission interface sections includes the following three structural elements.

(B1) three output terminals that are arranged in one line and that are respectively coupled to three transmission paths (B2) three sets of inductor elements and ESD protection elements that are provided for the respective output terminals and are arranged in a non-orthogonal direction with respect to a direction in which the three output terminals are arranged, and (B2) a driver circuit that outputs three actuation signals to the respective three output terminals through the respective three sets of the inductor elements and the ESD protection elements In the second transmission device and the second communication system according to an embodiment of the present disclosure, one set of an inductor element and an ESD protection element is provided for each output terminal. This covers a weakness with respect to ESD caused by enhancement in communication performance and also improves transmission characteristics of the first transmission device. Moreover, the inductor element and the ESD protection element included in each set are arranged in a non-orthogonal direction with respect to a direction in which the three output terminals are arranged. Compared to a case where the inductor element and the ESD protection element included in each set are arranged in an orthogonal direction with respect to the direction in which the three output terminals are arranged, the arrangement in the non-orthogonal direction makes it possible to cause a region for forming each inductor element to have a square shape or a shape close to a square, and further makes it easier to make an area of the region for forming each inductor element larger. As a result, for example, it is possible to increase the number of windings of each inductor element. Additionally, for example, it is possible to increase the width of the wiring, which makes it possible to increase a Q value of an inductor. Further, for example, it is possible to cause each inductor element to have a square shape, a hexagonal shape, an octagonal shape, and the like. In this manner, the second transmission device and the second communication system according to an embodiment of the present disclosure enable the transmission characteristics of the first second transmission device and the second transmission device to be improved, compared to the case where the inductor element and the ESD protection element included in each set are arranged in the orthogonal direction with respect to the direction in which the three output terminals are arranged.

The first transmission device, the second transmission device, the first communication system, and the second communication system according to an embodiment of the present disclosure cause transmission characteristics of the first transmission device and the second transmission device to be improved, and thus make it possible to enhance communication performance.

It is to be noted that the effects of the disclosure are not necessarily limited to the effects described above, and may be any of the effects described in the specification.

BRIEF DESCRIPTION OF DRAWINGS

FIG. 1 is a diagram illustrating a schematic configuration example of a communication system according to a first embodiment of the present disclosure.

FIG. 2 is a diagram illustrating an example of signal waveforms in the communication system illustrated in FIG. 1.

FIG. 3 is a diagram illustrating a modification example of the configuration of the transmission device illustrated in FIG. 1.

FIG. 4 is a diagram illustrating an example of variations of output resistances in the driver circuits illustrated in FIG. 1.

FIG. 5 is a diagram illustrating a modification example of the configuration of three ESD protection elements and three inductor elements illustrated in FIG. 1.

FIG. 6 is a diagram illustrating a schematic configuration example of a communication system according to a second embodiment of the present disclosure.

FIG. 7 is a diagram illustrating a configuration example of output terminals and peripheral circuits illustrated in FIG. 6.

FIG. 8 is a diagram illustrating a configuration example of output terminals and peripheral circuits illustrated in FIG. 6.

FIG. 9 is a diagram illustrating a configuration example of output terminals and peripheral circuits illustrated in FIG. 6.

FIG. 10 is a perspective view illustrating an external configuration of a smartphone to which the communication system according to the foregoing embodiments and the modification examples is applied.

FIG. 11 is a block diagram illustrating a configuration example of an application processor to which the communication system according to the foregoing embodiments and the modification examples is applied.

FIG. 12 is a block diagram illustrating a configuration example of an image sensor to which the communication system according to the foregoing embodiments and the modification examples is applied.

FIG. 13 is a block diagram depicting an example of schematic configuration of a vehicle control system.

FIG. 14 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. The following description is one specific example of the present disclosure, and the present disclosure is not limited thereto. It is to be noted that description is given in the following order.

1. First Embodiment
2. Second Embodiment
3. Application Examples and Further Application Examples 1. First Embodiment Configuration A communication system 1 according to a first embodiment of the present disclosure is described. FIG. 1 is a diagram illustrating a schematic configuration example of a communication system 1. The communication system 1 performs communication using signals having three voltage levels.

The communication system 1 includes a transmission device 10 and a reception device 20, the transmission device 10 transmitting three actuation signals through three transmission paths 30A, 30B, and 30C. The transmission device 10 includes three output terminals 15A, 15B, and 15C. The reception device 20 includes three input terminals 21A, 21B, and 21C. The output terminal 15A of the transmission device 10 and the input terminal 21A of the reception device 20 are coupled to each other through the transmission path 30A. The output terminal 15B of the transmission device 10 and the input terminal 21B of the reception device 20 are coupled to each other through the transmission path 30B. The output terminal 15C of the transmission device 10 and the input terminal 21C of the reception device 20 are coupled to each other through the transmission path 30C.

The transmission device 10 outputs a signal SIGA from the output terminal 15A, outputs a signal SIGB from the output terminal 15B, and outputs a signal SIGC from the output terminal 15C. The reception device 20 receives the signal SIGA through the output terminal 21A, receives the signal SIGB through the output terminal 21B, and receives the signal SIGC through the output terminal 21C. The signals SIGA, SIGB, and SIGC each transition between three voltage levels (a high-level voltage VH, a middle-level voltage VM, and a low-level voltage VL).

FIG. 2 is a diagram illustrating an example of signal waveforms in the communication system 1. Three signal waveforms from the top in FIG. 2 show voltage waveforms of the signals SIGA, SIGB, and SIGC. The transmission device 10 transmits six symbols "+x", "−x", "+y", "−y", "+z", and "−z" using three signals SIGA, SIGB, and SIGC. For example, in a case where the symbol "+x" is transmitted, the transmission device 10 sets the signal SIGA to the high-level voltage VH, the signal SIGB to the low-level voltage VL, and the signal SIGC to the middle-level voltage VM. In a case where the symbol "−x" is transmitted, the transmission device 10 sets the signal SIGA to the low-level voltage VL, the signal SIGB to the high-level voltage VH, and the signal SIGC to the middle-level voltage VM. In a case where the symbol "+y" is transmitted, the transmission device 10 sets the signal SIGA to the middle-level voltage VM, the signal SIGB to the high-level voltage VH, and the signal SIGC to the low-level voltage VL. In a case where the symbol "−y" is transmitted, the transmission device 10 sets the signal SIGA to the middle-level voltage VM, the signal SIGB to the low-level voltage VL, and the signal SIGC to the high-level voltage VH. In a case where the symbol "+z" is transmitted, the transmission device 10 sets the signal SIGA to the low-level voltage VL, the signal SIGB to the middle-level voltage VM, and the signal SIGC to the high-level voltage VH. In a case where the symbol "−z" is transmitted, the transmission device 10 sets the signal SIGA to the high-level voltage VH, the signal SIGB to the middle-level voltage VM, and the signal SIGC to the low-level voltage VL.

The transmission path 110 transmits a sequence of symbols using such signals SIGA, SIGB, and SIGC. In other words, the three transmission paths 30A, 30B, and 30C function as one lane that transmits the sequence of symbols.

Transmission Device 10

As illustrated in FIG. 1, the transmission device 10 includes a transmission data generator 11, a transmission section 12, three electrostatic discharge (ESD) protection elements 13 (13A, 13B, and 13C), three inductor elements 14 (14A, 14B, and 14C), three output terminals 15 (15A, 15B, and 15C), and a clock generator 16.

The transmission data generator 11, the transmission section 12, and the clock generator 16 each include an IC, and may possibly be weak with respect to ESD. Each of the ESD protection elements 13 (13A, 13B, and 13C) is provided for protecting the transmission data generator 11, the transmission section 12, and the clock generator 16 from ESD. Each of the inductor elements 14 (14A, 14B, and 14C) is provided for improving transmission characteristics of the transmission device 10.

The clock generator 16 generates a clock signal TxCK. The clock signal TxCK has a frequency of, for example, 3.5 [GHz]. It is to be noted that the clock generator 16 is not limited thereto. In a case where the transmission device 10 is configured using what is called a half rate architecture, it is possible that the clock generator 16 sets the frequency of the clock signal TxCK to 1.75 [GHz]. The clock generator 16 includes, for example, a phase-locked loop (PLL), and generates the clock signal TxCK on the basis of a reference clock supplied from the outside of the transmission device 10. The clock generator 11 supplies the transmission data generator 11 and the transmission section 12 with the clock signal TxCK.

The transmission data generator 11 generates a transition signal by performing predetermined processing. The transition signal indicates a transition of symbols in a sequence of symbols transmitted by the transmission device 10. The transmission data generator 11 supplies the transmission section 12 with the generated transition signal on the basis of the clock signal TxCK input from the clock generator 11.

The transmission section 12 generates the signals SIGA, SIGB, and SIGC on the basis of the transition signal input from the transmission section 12. The transmission section 12 includes, for example, an output controller 12D and three driver circuits 12A, 12B, and 12C. The output controller 12D generates a symbol signal on the basis of the transition signal input from the transmission section 12 and the clock signal TxCK input from the clock generator 11. The symbol signal indicates any one of six symbols "+x", "−x", "+y", "−y", "+z", and "−z". The output controller 12D generates control signals for the three driver circuits 12A, 12B, and 12C on the basis of the generated symbol signal and the clock signal TxCK input from the clock generator 11. The output controller 12D supplies the three driver circuits 12A, 12B, and 12C with the generated control signals.

The driver circuit 12A generates a signal SIGA on the basis of the control signal input from the output controller 12D. The driver circuit 12A outputs the generated signal SIGA to the output terminal 15A through the inductor element 14A and the ESD protection element 13A. The driver circuit 12B generates a signal SIGB on the basis of the control signal input from the output controller 12D. The driver circuit 12B outputs the generated signal SIGB to the output terminal 15B through the inductor element 14B and the ESD protection element 13B. The driver circuit 12C generates a signal SIGC on the basis of the control signal input from the output controller 12D. The driver circuit 12C outputs the generated signal SIGC to the output terminal 15C through the inductor element 14C and the ESD protection element 13C. The three signals SIGA, SIGC, and SIGB output to the three transmission paths 30A, 30B, and 30C have such signal waveforms as the three signal waveforms from the top in FIG. 2, for example.

The driver circuit 12A includes, for example, two resistance elements R1 and two transistors. One resistance element R1 has one end coupled to the inductor element 14A and the other end coupled to a source of one transistor. The other resistance element R1 has one end coupled to the inductor element 14A and the other end coupled to a drain of the other transistor. A resistance value of each resistance element R1 is approximately 50 Ω, for example. The driver circuit 12B includes, for example, two resistance elements R2 and two transistors. One resistance element R2 has one end coupled to the inductor element 14B and the other end coupled to a source of one transistor. The other resistance element R2 has one end coupled to the inductor element 14B and the other end coupled to a drain of the other transistor.

A resistance value of each resistance element R2 is approximately 50 Ω, for example. The driver circuit 12C includes, for example, two resistance elements R3 and two transistors. One resistance element R3 has one end coupled to the inductor element 14C and the other end coupled to a source of one transistor. The other resistance element R3 has one end coupled to the inductor element 14C and the other end coupled to a drain of the other transistor. A resistance value of each resistance element R3 is approximately 50 Ω, for example.

Reception Device 20

As illustrated in FIG. 1, the reception device 20 includes three input terminals 21 (21A, 21B, and 21C), a reception section 22, and a reception data processing section 23.

The reception section 22 receives the three signals SIGA, SIGB, and SIGC, and also generates a transition signal and a clock signal RxCK on the basis of the received signals SIGA, SIGB, and SIGC. The reception section 22 supplies the reception data processing section 23 with the generated transition signal and the generated clock signal RxCK. The reception data processing section 23 performs predetermined processing on the basis of the transition signal and the clock signal RxCK that have been input from the reception section 22. The reception section 22 includes, for example, three resistance elements R4, R5, and R6 and three amplifiers Amp1, Amp2, and Amp3.

The three resistance elements R4, R5, and R6 each function as a termination resistor of the communication system 1. The resistance value of those resistance elements are each approximately 50 Ω, for example. One end of the resistance element R4 is coupled to the input terminal 21A and is also coupled to a positive input terminal of the amplifier Amp1 and to a negative input terminal of the amplifier Amp3. One end of the resistance element R5 is coupled to the input terminal 21B and is also coupled to a positive input terminal of the amplifier Amp2 and to a negative input terminal of the amplifier Amp1. One end of the resistance element R6 is coupled to the input terminal 21C and is also coupled to a positive input terminal of the amplifier Amp3 and to a negative input terminal of the amplifier Amp2. The other end of the resistance element R4, the other end of the resistance element R5, and the other end of the resistance element R6 are coupled to each other.

This configuration causes the amplifier Amp1 to generate a signal SAB corresponding to an actuation signal AB serving as a difference (SIGA-SIGB) between the signal SIGA and the signal SIGB, causes the amplifier Amp2 to generate a signal SBC corresponding to an actuation signal BC serving as a difference (SIGB-SIGC) between the signal SIGB and the signal SIGC, and causes the amplifier Amp3 to generate a signal SCA corresponding to an actuation signal CA serving as a difference (SIGC-SIGA) between the signal SIGC and the signal SIGA.

Next, with reference to FIG. 1, a description is given of a configuration of three output terminals 15A, 15B, and 15C and peripheral circuits thereof The three output terminals 15A, 15B, and 15C are arranged in one line and are respectively coupled to the three transmission paths 30A, 30B, and 30C. The ESD protection element 13A and the inductor element 14A that are provided for the output terminal 15A are coupled to each other in series. The ESD protection element 13A is provided between the output terminal 15A and the driver circuit 12A. The ESD protection element 13B and the inductor element 14B that are provided for the output terminal 15B are coupled to each other in series. The ESD protection element 13B is provided between the output terminal 15B and the driver circuit 12B. The ESD protection element 13C and the inductor element 14C that are provided for the output terminal 15C are coupled to each other in series. The ESD protection element 13C is provided between the output terminal 15C and the driver circuit 12C.

The three ESD protection elements 13 and the three inductor elements 14 provided to the transmission device 10 are arranged in a non-orthogonal direction (a direction different from the horizontal direction in FIG. 1) with respect to a direction in which the three output terminals 15A, 15B, and 15C are arranged (the vertical direction in FIG. 1). The three ESD protection elements 13B and the three inductor elements 14B provided to the transmission device 10 are alternately arranged in a direction parallel to the direction in which the three output terminals 15A, 15B, and 15C are arranged. That is, the ESD protection element 13A and the inductor element 14A are arranged in a direction substantially orthogonal to a direction in which the driver circuit 12A and the output terminal 15A, which are opposed to each other, are arranged. The ESD protection element 13B and the inductor element 14B are arranged in a direction substantially orthogonal to a direction in which the driver circuit 12B and the output terminal 15B, which are opposed to each other, are arranged. The ESD protection element 13C and the inductor element 14C are arranged in a direction substantially orthogonal to a direction in which the driver circuit 12C and the output terminal 15C, which are opposed to each other, are arranged. This makes it possible to cause a region for forming each of the inductor elements 14 (14A, 14B, and 14C) to have a square shape or a shape close to a square.

In a case where the region for forming each of the inductor elements 14 (14A, 14B, and 14C) has a square shape or a shape close to a square, it is possible to increase the number of windings of each of the inductor elements 14 (14A, 14B, and 14C). Further, it is possible to cause each of the inductor elements 14 (14A, 14B, and 14C) to have a square shape, a hexagonal shape, an octagonal shape, and the like. Moreover, compared to a case where the ESD protection element 13C and the inductor element 14C are arranged in a direction in which the driver circuit 12C and the output terminal 15C, which are opposed to each other, are arranged, it becomes easier to make an area of the region for forming each of the inductor elements 14 (14A, 14B, and 14C) larger. As a result, it is possible to increase the number of windings of each of the inductor elements 14 (14A, 14B, and 14C). Additionally, it is possible to increase the width of the wiring of each of the inductor elements 14 (14A, 14B, and 14C), which makes it possible to increase a Q value of each of the inductor elements 14 (14A, 14B, and 14C). It is to be noted that each of the inductor elements 14 (14A, 14B, and 14C) may be configured using a single-layer planar coil or a multi-layer planar coil.

Effects

Next, effects of the communication system 1 are described.

In association with high functionality and multi-functionality of electronic apparatuses in recent years, the electronic apparatuses are mounted with various devices such as a semiconductor chip, a sensor, and a display device. A lot of pieces of data are exchanged between these devices, and the amount of such data has been increased with high functionality and multi-functionality of the electronic apparatuses.

Accordingly, the data are often exchanged with use of a high-speed interface. The high-speed interface is able to transmit and receive data at several Gbps, for example. Various techniques have been disclosed for enhancing communication performance in a high-speed interface. However, in the field of communication systems, it is desirable to enhance communication performance.

In contrast, in the present embodiment, one set of the inductor element 14 and the ESD protection element 13 is provided for each output terminal 15. This covers a weakness with respect to ESD caused by enhancement in communication performance and also improves transmission characteristics of the transmission device 10. Moreover, the inductor element 14 and the ESD protection element 13 included in each set are arranged in a non-orthogonal direction with respect to a direction in which the three output terminals 15 are arranged. Compared to a case where the inductor element 14 and the ESD protection element 13 included in each set are arranged in an orthogonal direction with respect to the direction in which the three output terminals 15 are arranged, the arrangement in a non-orthogonal direction makes it possible to cause a region for forming each inductor element 14 to have a square shape or a shape close to a square, and further makes it easier to make an area of the region for forming each inductor element 14 larger. As a result, it is possible to increase the number of windings of each inductor element 14. Additionally, it is possible to increase the width of the wiring of each inductor element 14, which makes it possible to increase a Q value of each inductor element 14. Further, it is possible to cause each inductor element 14 to have a square shape, a hexagonal shape, an octagonal shape, and the like. In this manner, the present embodiment enables the transmission characteristics of the transmission device 10 to be improved, compared to the case where the inductor element 14 and the ESD protection element 13 included in each set are arranged in an orthogonal direction with respect to the direction in which the three output terminals 15 are arranged. Accordingly, it is possible to enhance communication performance.

In a currently-available communication system using two-line differential signals, a technology has been used in which an inductor element is disposed in the former stage so as to cancel parasitic capacitance of an ESD protection element or an output terminal serving as output load capacitance, thereby improving transmission characteristics. In this case, for example, a symmetrical arrangement has been used for a physical arrangement of the inductor elements, taking into account a mutual inductance between differentials. However, since three-line differential signals are used in the present embodiment, transmission characteristics deteriorate when the arrangement of inductor elements in which two lines are in a symmetrical shape is used.

In contrast, according to the present embodiment, three inductor elements 14 and three ESD protection elements 13 included in the transmission device 10 are alternately arranged in a direction parallel to the direction in which the three output terminals 15 are arranged. This makes it possible that the distance between inductor elements 14 to be increased, and thus makes it possible to reduce the mutual inductance between adjacent signals. As a result, it is possible to improve transmission characteristics of the transmission device 10 and therefore to enhance communication performance.

2. Modification Example of First Embodiment

Next, a modification example of the communication system 1 according to the foregoing embodiment is described.

Modification Example A

FIG. 3 is a diagram illustrating a modification example of the configuration of the transmission device 10. Among the three inductor elements 14 included in the transmission device 10 according to the present modification example, a value of the inductance of the inductor element 14 (14B) in the middle is larger than values of the inductances of two inductor elements 14 (14A and 14C) on both sides. To be specific, among the three inductor elements 14 included in the transmission device 10 according to the present modification example, values of the number of windings and an area of the inductor element 14 (14B) in the middle are larger than values of the number of windings and areas of the two inductor elements 14 (14A and 14C).

FIG. 4 is a diagram illustrating an example of variation of output resistances R1, R2, and R3 in the driver circuits 12A, 12B, and 12C according to the foregoing embodiment. FIG. 4 illustrates the worst to the tenth worst amplitudes in eye patterns for the cases in which, in the driver circuits 12A, 12B, and 12C according to the foregoing embodiment, the output resistances R1, R2, and R3 are in a standard, in a combination A, a combination B, and in a combination C. FIG. 4 further illustrates differences (variations) in the worst to the tenth worst amplitudes, and determination results of whether the transmission characteristics are acceptable or not.

FIG. 4 shows that, in the case where the output resistances R1, R2, and R3 are in the combination B, the difference (variation) is the smallest, the eye aperture is the largest, and the transmission characteristics are improved more than the standard case.

In the present modification example, in order to obtain effects similar to the effects obtained in the case where the output resistances R1, R2, and R3 are in the combination B, the inductance of the inductor element 14 (14B) in the middle instead of the output resistances R1, R2, and R3 is made larger than the inductances of two inductor elements 14 (14A and 14C) on both sides. The reason that makes it possible to increase the inductance of the inductor element 14 (14B) in the middle is that the three inductor elements 14 and the three ESD protection element 13 are arranged in a direction parallel to the direction in which the three output terminals 15 are arranged. With the inductance of the inductor element 14 (14B) in the middle having a larger value than the values of the inductances of the two inductor elements 14 (14A and 14C) on both sides, it is possible to make the eye aperture large and to improve the transmission characteristics more than the standard case.

Modification Example B

FIG. 5 is a diagram illustrating a modification example of the configuration of three ESD protection elements 13 (13A, 13B, and 13C) and three inductor elements 14 (14A, 14B, and 14C). In the present modification example, the three ESD protection elements 13 (13A, 13B, and 13C) and the three inductor elements 14 (14A, 14B, and 14C) are provided to a mount substrate 120. The mount substrate 120 includes a support base 121 that supports the three ESD protection elements 13 (13A, 13B, and 13C), the three inductor elements 14 (14A, 14B, and 14C), and the three output terminals 15 (15A, 15B, and 15C). The mount substrate 120 further includes, for example, the three ESD protection elements 13 (13A, 13B, and 13C) provided on a surface of the support base 121, and an insulating layer 122 that functions as a correlation insulating film. The mount substrate 120 further includes, for example, two inductor elements 14 (14A and 14C) provided inside the insulating layer 122 and one inductor element 14 (14B) provided on the top surface of the insulating layer 122.

According to the present modification example, the inductor element 14A and the ESD protection element 13A are arranged in the normal direction of the support base 121. The inductor element 14B and the ESD protection element 13B are arranged in the normal direction of the support base 121. The inductor element 14C and the ESD protection element 13C are arranged in the normal direction of the support base 121. According to the present modification example, among the three inductor elements 14 (14A, 14B, and 14C) included in the transmission device 10, the inductor element 14 (14B) in the middle is disposed further away from the support base 121 than the two inductor elements 14 (14A and 14C) on both sides.

Accordingly, a distance D3 between the inductor element 14C and the inductor element 14A is smaller than the width of the inductor element 14B, for example. Further, for example, a distance D1 between the inductor element 14A and the inductor element 14B, a distance D2 between the inductor element 14B and the inductor element 14C, and the distance D3 between the inductor element 14C and the inductor element 14A are equal to each other, or substantially equal to each other. As a result, compared to a case where the three ESD protection elements 13 (13A, 13B, and 13C) are arranged in one line on the same plane, it is possible to reduce the variation of the mutual inductor between the differentials. Therefore, it is possible to make the eye aperture large and to improve the transmission characteristics.

3. Second Embodiment

Next, a communication system 2 according to the second embodiment of the present disclosure is described. FIG. 6 illustrates a schematic configuration example of the communication system 2. Similar to the communication system 1 according to the above embodiment, the communication system 2 performs communication using signals having three voltage levels.

The communication system 2 includes a transmission device 40 and a reception device 50, the transmission device 40 transmitting three actuation signals through three transmission path groups 30 for each transmission path group 30. Each transmission path group 30 has three transmission paths 30A, 30B, and 30C.

The transmission device 40 includes three transmission interface sections 41 each coupled to one transmission path group 30. Each transmission interface section 41 includes a transmission section 12, three ESD protection elements 13 (13A, 13B, and 13C), three inductor elements 14 (14A, 14B, and 14C), and three output terminals 15 (15A, 15B, and 15C). In the present embodiment, the transmission data generator 11 supplies each transmission interface section 41 with a generated transition signal. The clock generator 16 supplies each transmission interface section 41 with a clock signal TxCK.

The reception device 50 includes three reception interface sections 51 each coupled to one transmission path group 30. Each reception interface section 51 includes three input terminals 21 (21A, 21B, and 21C) and a reception section 22. In the present embodiment, the reception data processing section 23 performs processing or processing on the basis of the transition signals and the clock signals RxCK input from the respective reception interface sections 51.

FIG. 7 illustrates a configuration example of a plurality of output terminals 15 and peripheral circuits included in the transmission device 40. In FIG. 7, a distance D1 of a short arrow represents a distance between the inductor element 14A and the inductor element 14B. A distance D2 of a short arrow represents a distance between the inductor element 14B and the inductor element 14C. A distance D3 of a short arrow represents a distance between the inductor element 14C and the inductor element 14A. A distance D1 of a long arrow represents a distance between the inductor element 14A and the inductor element 14B opposing each other via the inductor element 14C. A distance D2 of a long arrow represents a distance between the inductor element 14B and the inductor element 14C opposing each other via the inductor element 14A. A distance D3 of a long arrow represents a distance between the inductor element 14C and the inductor element 14A opposing each other via the inductor element 14B.

The output terminals 15A, 15B, and 15C are arranged in one line. In each transmission interface section 41, the three output terminals 15A, 15B, and 15C are respectively coupled to the three transmission paths 30A, 30B, and 30C. The ESD protection element 13A and the inductor element 14A provided to the output terminal 15A are coupled to each other in series. The ESD protection element 13B and the inductor element 14B provided to the output terminal 15B are coupled to each other in series. The ESD protection element 13C and the inductor element 14C provided to the output terminal 15C are coupled to each other in series.

The plurality of ESD protection elements 13 and the plurality of inductor elements 14 are arranged in a non-orthogonal direction (a direction different from the horizontal direction in FIG. 7) with respect to a direction in which the plurality of output terminals 15 is arranged (the vertical direction in FIG. 7). The plurality of ESD protection elements 13 and the plurality of inductor elements 14 are disposed to allow a distance between two inductor elements 14 each disposed adjacent to one inductor element 14 and a distance between two inductor elements 14 each disposed adjacent to another inductor element 14 to be equal to each other, or substantially equal to each other.

For example, the plurality of ESD protection elements 13 and the plurality of inductor elements 14 are disposed to allow a distance between two inductor elements 14B and 14C each disposed adjacent to one inductor element 14A and a distance between two inductor elements 14B and 14C each disposed adjacent to another inductor element 14A to be equal to each other, or substantially equal to each other. Further, for example, the plurality of ESD protection elements 13 and the plurality of inductor elements 14 are disposed to allow a distance between two inductor elements 14A and 14C each disposed adjacent to one inductor element 14B and a distance between two inductor elements 14A and 14C each disposed adjacent to another inductor element 14B to be equal to each other, or substantially equal to each other. Moreover, for example, the plurality of ESD protection elements 13 and the plurality of inductor elements 14 are disposed to allow a distance between two inductor elements 14A and 14B each disposed adjacent to one inductor element 14C and a distance between two inductor elements 14A and 14B each disposed adjacent to another inductor element 14C to be equal to each other, or substantially equal to each other.

The plurality of ESD protection elements 13B and the plurality of inductor elements 14B are alternately arranged in a direction parallel to the direction in which the plurality of output terminals 15 is arranged. That is, the ESD protection element 13A and the inductor element 14A are arranged in a direction substantially orthogonal to a direction in which the driver circuit 12A and the output terminal 15A, which are opposed to each other, are arranged. The ESD protection element 13B and the inductor element 14B are arranged in a direction substantially orthogonal to a direction in which the driver circuit 12B and the output terminal 15B, which are opposed to each other, are arranged. The ESD protection element 13C and the inductor element 14C are arranged in a direction substantially orthogonal to a direction in which the driver circuit 12C and the output terminal 15C, which are opposed to each other, are arranged. This makes it possible to cause a region for forming each of the inductor elements 14 (14A, 14B, and 14C) to have a square shape or a shape close to a square.

In a case where the region for forming each of the inductor elements 14 (14A, 14B, and 14C) has a square shape or a shape close to a square, it is possible to increase the number of windings of each of the inductor elements 14 (14A, 14B, and 14C). Moreover, compared to a case where the ESD protection element 13C and the inductor element 14C are arranged in a direction in which the driver circuit 12C and the output terminal 15C, which are opposed to each other, are arranged, it becomes easier to make an area of the region for forming each of the inductor elements 14 (14A, 14B, and 14C) larger. This also makes it possible to increase the number of windings of each of the inductor elements 14 (14A, 14B, and 14C). Further, in this case, each of the inductor elements 14 (14A, 14B, and 14C) may be configured using a single-layer planar coil or a multi-layer planar coil.

Effects

Next, effects of the communication system 2 are described.

In the present embodiment, one set of the inductor element 14 and the ESD protection element 13 is provided for each output terminal 15. This covers a weakness with respect to ESD caused by enhancement in communication performance and also improves transmission characteristics of the transmission device 40. Moreover, the plurality of inductor elements 14 and the plurality of ESD protection elements 13 are arranged in a non-orthogonal direction with respect to a direction in which the plurality of output terminals 15 is arranged. Compared to a case where the plurality of inductor elements 14 and the plurality of ESD protection elements 13 are arranged in an orthogonal direction with respect to the direction in which the plurality of output terminals 15 is arranged, the arrangement in a non-orthogonal direction makes it possible to cause a region for forming each inductor element 14 to have a square shape or a shape close to a square, and further makes it easier to make an area of the region for forming each inductor element 14 larger. As a result, it is possible to increase the number of windings of each inductor element 14. Accordingly, it is possible to improve transmission characteristics of the transmission device 10, and thus is possible to enhance communication performance.

Further, according to the present embodiment, the plurality of inductor elements 14 and the plurality of ESD protection elements 13 included in the transmission device 40 are alternately arranged in a direction parallel to the direction in which the plurality of output terminals 15 is arranged. This makes it possible that the distance between inductor elements 14 to be increased, and thus makes it possible to reduce variation in the mutual inductance between differentials. As a result, it is possible to improve transmission characteristics of the transmission device 40 and therefore to enhance communication performance.

Moreover, in the present embodiment, the plurality of ESD protection elements 13 and the plurality of inductor elements 14 are disposed to allow a distance between two inductor elements 14 each disposed adjacent to one inductor element 14 and a distance between two inductor elements 14 each disposed adjacent to another inductor element 14 to be equal to each other, or substantially equal to each other. This makes it possible that the distances between inductor elements 14 are substantially equal to each other, and thus makes it possible to reduce variation in the mutual inductance between differentials. As a result, it is possible to improve transmission characteristics of the transmission device 40 and therefore to enhance communication performance.

Additionally, according to the present embodiment, the plurality of inductor elements 14 and the plurality of ESD protection elements 13 included in the transmission device 40 are alternately arranged in a direction parallel to the direction in which the plurality of output terminals 15 is arranged. This makes it possible that the distance between inductor elements 14 to be increased, and thus makes it possible to reduce the mutual inductance between differentials. As a result, it is possible to improve transmission characteristics of the transmission device 10 and therefore to enhance communication performance.

4. Modification Example of Second Embodiment

Next, a modification example of the communication system 2 according to the second embodiment is described.

Modification Example C

FIG. 8 illustrates a configuration example of a plurality of output terminals 15 and peripheral circuits included in the transmission device 40. In the present modification example, each transmission interface section 41 includes one constant-voltage terminal 15D to which a constant voltage is applied, which is coupled to the corresponding driver circuit 12A. The plurality of constant-voltage terminals 15D included in the transmission device 40 is disposed among the arrangement of the plurality of output terminals 15 included in the transmission device 40.

In FIG. 8, a distance D1 of a short arrow represents a distance between the inductor element 14A and the inductor element 14B. A distance D2 of a short arrow represents a distance between the inductor element 14B and the inductor element 14C. A distance D3 of a short arrow represents a distance between the inductor element 14C and the inductor element 14A. A distance D1 of a long arrow represents a distance between the inductor element 14A and the inductor element 14B opposing each other via the inductor element 14C. A distance D2 of a long arrow represents a distance between the inductor element 14B and the inductor element 14C opposing each other via the inductor element 14A. A distance D3 of a long arrow represents a distance between the inductor element 14C and the inductor element 14A opposing each other via the inductor element 14B.

The output terminals 15A, 15B, and 15C are arranged in one line. In each transmission interface section 41, the three output terminals 15A, 15B, and 15C are respectively coupled to the three transmission paths 30A, 30B, and 30C. The ESD protection element 13A and the inductor element 14A provided to the output terminal 15A are coupled to each other in series. The ESD protection element 13B and the inductor element 14B provided to the output terminal 15B are coupled to each other in series. The ESD protection element 13C and the inductor element 14C provided to the output terminal 15C are coupled to each other in series.

The plurality of ESD protection elements 13 and the plurality of inductor elements 14 are arranged in a non-orthogonal direction (a direction different from the horizontal direction in FIG. 8) with respect to a direction in which the plurality of output terminals 15 is arranged (the vertical direction in FIG. 8). The plurality of ESD protection elements 13 and the plurality of inductor elements 14 are disposed to allow a distance between two inductor elements 14 each disposed adjacent to one inductor element 14 and a distance between two inductor elements 14 each disposed adjacent to another inductor element 14 to be equal to each other, or substantially equal to each other.

For example, the plurality of ESD protection elements 13 and the plurality of inductor elements 14 are disposed to allow a distance between two inductor elements 14B and 14C each disposed adjacent to one inductor element 14A and a distance between two inductor elements 14B and 14C each disposed adjacent to another inductor element 14A to be equal to each other, or substantially equal to each other. Further, for example, the plurality of ESD protection elements 13 and the plurality of inductor elements 14 are disposed to allow a distance between two inductor elements 14A and 14C each disposed adjacent to one inductor element 14B and a distance between two inductor elements 14A and 14C each disposed adjacent to another inductor element 14B to be equal to each other, or substantially equal to each other. Moreover, for example, the plurality of ESD protection elements 13 and the plurality of inductor elements 14 are disposed to allow a distance between two inductor elements 14A and 14B each disposed adjacent to one inductor element 14C and a distance between two inductor elements 14A and 14B each disposed adjacent to another inductor element 14C to be equal to each other, or substantially equal to each other.

The plurality of inductor elements 14 and the plurality of ESD protection elements 13 included in the transmission device 40 are disposed to allow two inductor elements 14 to be adjacent to each other and also to allow two ESD protection elements 13 to be adjacent to each other. In addition, the plurality of constant-voltage terminals 15D included in the transmission device 40 is disposed among the arrangement of the plurality of output terminals 15 included in the transmission device 40, and is disposed to allow intervals between respective two adjacent inductor elements 14 to be increased.

The ESD protection element 13A and the inductor element 14A are arranged in a direction substantially orthogonal to a direction in which the driver circuit 12A and the output terminal 15A, which are opposed to each other, are arranged. The ESD protection element 13B and the inductor element 14B are arranged in a direction substantially orthogonal to a direction in which the driver circuit 12B and the output terminal 15B, which are opposed to each other, are arranged. The ESD protection element 13C and the inductor element 14C are arranged in a direction substantially orthogonal to a direction in which the driver circuit 12C and the output terminal 15C, which are opposed to each other, are arranged. This makes it possible to cause a region for forming each of the inductor elements 14 (14A, 14B, and 14C) to have a square shape or a shape close to a square.

In a case where the region for forming each of the inductor elements 14 (14A, 14B, and 14C) has a square shape or a shape close to a square, it is possible to increase the number of windings of each of the inductor elements 14 (14A, 14B, and 14C). Moreover, compared to a case where the ESD protection element 13C and the inductor element 14C are arranged in a direction in which the driver circuit 12C and the output terminal 15C, which are opposed to each other, are arranged, it becomes easier to make an area of the region for forming each of the inductor elements 14 (14A, 14B, and 14C) larger. This also makes it possible to increase the number of windings of each of the inductor elements 14 (14A, 14B, and 14C). Further, in this case, each of the inductor elements 14 (14A, 14B, and 14C) may be configured using a single-layer planar coil or a multi-layer planar coil.

In the present modification example, the plurality of inductor elements 14 and the plurality of ESD protection elements 13 included in the transmission device 40 are disposed to allow two inductor elements 14 to be adjacent to each other and also to allow two ESD protection elements 13 to be adjacent to each other. In addition, the plurality of constant-voltage terminals 15D included in the transmission device 40 is disposed among the arrangement of the plurality of output terminals 15 included in the transmission device 40, and is disposed to allow intervals between respective two adjacent inductor elements 14 to be increased. This makes it possible that the distance between inductor elements 14 to be increased, and thus makes it possible to reduce the mutual inductance between differentials. As a result, it is possible to improve transmission characteristics of the transmission device 10 and therefore to enhance communication performance.

Modification Example D

FIG. 9 illustrates a configuration example of a plurality of output terminals 15 and peripheral circuits included in the transmission device 40. In the present modification example, each transmission interface section 41 includes one constant-voltage terminal 15D to which a constant voltage is applied, which is coupled to the corresponding driver circuit 12A. The plurality of constant-voltage terminals 15D included in the transmission device 40 is disposed among the arrangement of the plurality of output terminals 15 included in the transmission device 40.

In FIG. 9, a distance D1 of a short arrow represents a distance between the inductor element 14A and the inductor element 14B. A distance D2 of a short arrow represents a distance between the inductor element 14B and the inductor element 14C. A distance D3 of a short arrow represents a distance between the inductor element 14C and the inductor element 14A. A distance D1 of a long arrow represents a distance between the inductor element 14A and the inductor element 14B opposing each other via the inductor element 14C. A distance D2 of a long arrow represents a distance between the inductor element 14B and the inductor element 14C opposing each other via the inductor element 14A. A distance D3 of a long arrow represents a distance between the inductor element 14C and the inductor element 14A opposing each other via the inductor element 14B.

The output terminals 15A, 15B, and 15C are arranged in one line. In each transmission interface section 41, the three output terminals 15A, 15B, and 15C are respectively coupled to the three transmission paths 30A, 30B, and 30C.

The ESD protection element 13A and the inductor element 14A provided to the output terminal 15A are coupled to each other in series. The ESD protection element 13B and the inductor element 14B provided to the output terminal 15B are coupled to each other in series. The ESD protection element 13C and the inductor element 14C provided to the output terminal 15C are coupled to each other in series.

The plurality of ESD protection elements 13 and the plurality of inductor elements 14 are arranged in a non-orthogonal direction (a direction different from the horizontal direction in FIG. 9) with respect to a direction in which the plurality of output terminals 15 is arranged (the vertical direction in FIG. 9). The plurality of ESD protection elements 13 and the plurality of inductor elements 14 are disposed to allow a distance between two inductor elements 14 each disposed adjacent to one inductor element 14 and a distance between two inductor elements 14 each disposed adjacent to another inductor element 14 to be equal to each other, or substantially equal to each other.

For example, the plurality of ESD protection elements 13 and the plurality of inductor elements 14 are disposed to allow a distance between two inductor elements 14B and 14C each disposed adjacent to one inductor element 14A and a distance between two inductor elements 14B and 14C each disposed adjacent to another inductor element 14A to be equal to each other, or substantially equal to each other. Further, for example, the plurality of ESD protection elements 13 and the plurality of inductor elements 14 are disposed to allow a distance between two inductor elements 14A and 14C each disposed adjacent to one inductor element 14B and a distance between two inductor elements 14A and 14C each disposed adjacent to another inductor element 14B to be equal to each other, or substantially equal to each other. Moreover, for example, the plurality of ESD protection elements 13 and the plurality of inductor elements 14 are disposed to allow a distance between two inductor elements 14A and 14B each disposed adjacent to one inductor element 14C and a distance between two inductor elements 14A and 14B each disposed adjacent to another inductor element 14C to be equal to each other, or substantially equal to each other.

The plurality of ESD protection elements 13B and the plurality of inductor elements 14B are alternately arranged in a direction parallel to the direction in which the plurality of output terminals 15 is arranged. That is, the ESD protection element 13A and the inductor element 14A are arranged in a direction substantially orthogonal to a direction in which the driver circuit 12A and the output terminal 15A, which are opposed to each other, are arranged. The ESD protection element 13B and the inductor element 14B are arranged in a direction substantially orthogonal to a direction in which the driver circuit 12B and the output terminal 15B, which are opposed to each other, are arranged. The ESD protection element 13C and the inductor element 14C are arranged in a direction substantially orthogonal to a direction in which the driver circuit 12C and the output terminal 15C, which are opposed to each other, are arranged. This makes it possible to cause a region for forming each of the inductor elements 14 (14A, 14B, and 14C) to have a square shape or a shape close to a square.

In a case where the region for forming each of the inductor elements 14 (14A, 14B, and 14C) has a square shape or a shape close to a square, it is possible to increase the number of windings of each of the inductor elements 14 (14A, 14B, and 14C). Moreover, compared to a case where the ESD protection element 13C and the inductor element 14C are arranged in a direction in which the driver circuit 12C and the output terminal 15C, which are opposed to each other, are arranged, it becomes easier to make an area of the region for forming each of the inductor elements 14 (14A, 14B, and 14C) larger. This also makes it possible to increase the number of windings of each of the inductor elements 14 (14A, 14B, and 14C). Further, in this case, each of the inductor elements 14 (14A, 14B, and 14C) may be configured using a single-layer planar coil or a multi-layer planar coil.

In the present modification example, each transmission interface section 41 includes one constant-voltage terminal 15D to which a constant voltage is applied, which is coupled to the corresponding driver circuit 12A. The plurality of constant-voltage terminals 15D included in the transmission device 40 is disposed among the arrangement of the plurality of output terminals 15 included in the transmission device 40. This makes it possible that the distance between inductor elements 14 to be increased, and thus makes it possible to reduce the mutual inductance between differentials. As a result, it is possible to improve transmission characteristics of the transmission device 10 and therefore to enhance communication performance.

5. Application Examples and Further Application Examples

Next, description is given of application examples and further application examples of the communication system 1 and the communication system 2 that have been described in the foregoing embodiments and modification examples.

Application Examples

FIG. 10 illustrates an appearance of a smartphone 300 (a multi-functional mobile phone) to which the communication system 1 and the communication system 2 according to any of the foregoing embodiments, etc. is applied. Various devices are mounted in the smartphone 300. The communication system according to any of the foregoing embodiments, etc. is applied to a communication system that exchanges data between these devices.

FIG. 10 illustrates a configuration example of an application processor 310 used in the smartphone 300. The application processor 310 includes a central processing unit (CPU) 311, a memory controller 312, a power controller 313, an external interface 314, a graphics processing unit (GPU) 315, a media processing section 316, a display controller 317, and a mobile industry processor interface (MIPI) interface 318. In this example, the CPU 311, the memory controller 312, the power controller 313, the external interface 314, the GPU 315, the media processing section 316, and the display controller 317 are coupled to a system bus 319 to allow for mutual data exchange via the system bus 319.

The CPU 311 processes various pieces of information handled in the smartphone 300 in accordance with a program. The memory controller 312 controls a memory 501 used at a time when the CPU 311 performs information processing. The power controller 313 controls a power supply of the smartphone 300.

The external interface 314 is an interface for communication with external devices. In this example, the external interface 314 is coupled to a radio communication section 502 and an image sensor 410. The radio communication section 502 performs wireless communication with mobile phone base stations. The radio communication section 502 includes, for example, a baseband section and a radio frequency (RF) front end section. The image sensor 410 acquires an image, and includes, for example, a CMOS sensor.

The GPU 315 performs image processing. The media processing section 316 processes information such as voice, letters, and graphics. The display controller 317 controls the display 504 via the MIPI interface 318. The MIPI interface 318 transmits an image signal to the display 504. As the image signal, for example, a YUV-format signal, an RGB-format signal, or any other format signal may be used. The MIPI interface 318 operates, on the basis of a reference clock supplied from an oscillator circuit 330 including a crystal resonator, for example. For example, the communication system 1 and the communication system 2 according to any of the foregoing embodiments, etc. is applied to a communication system between the MIPI interface 318 and the display 504.

FIG. 12 illustrates a configuration example of the image sensor 410. The image sensor 410 includes a sensor section 411, an image signal processor (ISP) 412, a joint photographic experts group (JPEG) encoder 413, a CPU 414, a random access memory (RAM) 415, a read only memory (ROM) 416, a power controller 417, an inter-integrated circuit ($I^2C$) interface 418, and an MIPI interface 419. In this example, these blocks are coupled to a system bus 420 to allow for mutual data exchange via the system bus 420.

The sensor section 411 acquires an image, and is configured by, for example, a CMOS sensor. The ISP 412 performs predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory used at a time when the CPU 414 performs information processing. The ROM 416 stores a program to be executed in the CPU 414, a setting value obtained by calibration, and any other information. The power controller 417 controls a power supply of the image sensor 410. The $I^2C$ interface 418 receives a control signal from the application processor 310. Although not illustrated, the image sensor 410 also receives a clock signal from the application processor 310, in addition to the control signal. Specifically, the image sensor 410 is configured to be operable on the basis of clock signals of various frequencies. The MIPI interface 419 transmits an image signal to the application processor 310. As the image signal, for example, a YUV-format signal, an RGB-format signal, or any other format signal may be used. The MIPI interface 419 operates on the basis of a reference clock supplied from an oscillator circuit 430 including a crystal resonator, for example. For example, the communication system 1 and the communication system 2 according to any of the foregoing embodiments, etc. is applied to a communication system between the MIPI interface 419 and the application processor 310.

Further Application Example

The technology according to an embodiment of the present disclosure is applicable to various products. For example, the technology according to an embodiment of the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, a drone, a vessel, a robot, a construction machine, and an agricultural machine (tractor).

FIG. 13 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 13, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 13 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 14 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 13, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM) (registered trademark), worldwide interoperability for microwave access (WiMAX), long term evolution (LTE)), LTE-advanced (LTE-A), or the like, or another wireless communication protocol such as wireless LAN (referred to also as wireless fidelity (Wi-Fi) (registered trademark), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI) (registered trademark), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 32, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 13 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the communication system 1 and the communication system 2 described with reference to the embodiments and modification examples above may be applied to a communication system among respective blocks in the further application example illustrated in FIG. 13. To be specific, the present disclosure may be applied to a communication system between the imaging section 7410 (imaging sections 7910, 7912, 7914, 7916, and 7918 and the outside-vehicle information detecting unit 7400, for example. This makes it possible, for example, to enhance communication quality in the vehicle control system 7000, and therefore to supply the outside-vehicle information detecting unit 7400 with a high-quality image. As a result, it is possible that the vehicle control system 7000 more accurately grasps outside-vehicle information.

Although the present disclosure has been described above referring to some embodiments and modification examples as well as application examples and further application examples, the disclosure is not limited to those embodiments, etc., and may be modified in a variety of ways.

For example, although the present disclosure has been applied to a communication system that performs communication using signals having three voltage levels in the foregoing embodiments, the disclosure is not limited to those embodiments, and instead, the present disclosure may be applied to a communication system that performs communication using signals having four or more voltage levels. To be specific, for example, a transmission device may be configured to transmit four signals SIG1, SIG2, SIG3, and SIG4 to a reception device. Those signals SIG1, SIG2, SIG3, and SIG4 each transition between four voltage levels. Those signals SIG1, SIG2, SIG3, and SIG4 are set to voltage levels different from each other.

Although the disclosure is described hereinabove with reference to the example embodiments and modification examples, these embodiments and modification examples are not to be construed as limiting the scope of the disclosure and may be modified in a wide variety of ways. It should be appreciated that the effects described herein are mere examples. Effects of an example embodiment and modification examples of the disclosure are not limited to those described herein. The disclosure may further include any effects other than those described herein.

Moreover, the present disclosure may have the following configurations.

(1)

A transmission device including:

three output terminals that are arranged in one line and that are respectively coupled to three transmission paths;

three sets of inductor elements and ESD protection elements that are provided for the respective output terminals and are arranged in a non-orthogonal direction with respect to a direction in which the three output terminals are arranged; and a driver circuit that outputs three actuation signals to the respective three output terminals through the respective three sets of the inductor elements and the ESD protection elements.

(2)

The transmission device according to (1), in which a plurality of the inductor elements and a plurality of the ESD protection elements included in the three sets are alternately arranged in a direction parallel to a direction in which the three output terminals are arranged.

(3)

The transmission device according to (2), in which, among three of the inductor elements included in the three sets, a value of an inductance of the inductor element in a middle is larger than values of inductances of the two inductor elements on both sides.

(4)

The transmission device according to (1), in which, in each of the sets, the inductor element and the ESD protection element are arranged in a normal direction of a support base that supports the three output terminals.

(5)

The transmission device according to (4), in which, among three of the inductor elements included in the three sets, the inductor element in a middle is disposed further away from the support base than the two inductor elements on both sides.

(6)

A transmission device including a plurality of transmission interface sections, each of the transmission interface sections including three output terminals that are arranged in one line and that are respectively coupled to three transmission paths, three sets of inductor elements and ESD protection elements that are provided for the respective output terminals and are arranged in a non-orthogonal direction with respect to a direction in which the three output terminals are arranged, and a driver circuit that outputs three actuation signals to the respective three output terminals through the respective three sets of the inductor elements and the ESD protection elements.

(7)

The transmission device according to (6), in which a plurality of the inductor elements and a plurality of the ESD protection elements included in the three transmission interface sections are disposed to allow a distance between two of the inductor elements each disposed adjacent to one of the inductor elements and a distance between two of the inductor elements each disposed adjacent to another one of the inductor elements to be substantially equal to each other.

(8)

The transmission device according to (6), in which a plurality of the inductor elements and a plurality of the ESD protection elements included in the three transmission interface sections are alternately arranged in a direction parallel to a direction in which the three output terminals are arranged.

(9)

The transmission device according to (8), in which each of the transmission interface sections includes one constant-voltage terminal to which a constant voltage is applied, which is coupled to the driver circuit, and a plurality of the constant-voltage terminals included in the three transmission interface sections is disposed among an arrangement of a plurality of output terminals included in the three transmission interface sections.

(10)

The transmission device according to (6), in which each of the transmission interface sections includes one constant-voltage terminal to which a constant voltage is applied, which is coupled to the driver circuit, a plurality of the inductor elements and a plurality of the ESD protection elements included in the three transmission interface sections are disposed to allow two of the inductor elements to be adjacent to each other and also to allow two of the ESD protection elements to be adjacent to each other, and a plurality of the constant-voltage terminals included in the three transmission interface sections is disposed among an arrangement of a plurality of output terminals included in the three transmission interface sections, and is also disposed to allow intervals between two of the inductor elements adjacent to each other to be increased.

(11)

A communication system including:

a transmission device that transmits three actuation signals through three transmission paths; and a reception device, the transmission device including three output terminals that are arranged in one line and that are respectively coupled to the three transmission paths, three sets of inductor elements and ESD protection elements that are provided for the respective output terminals and are arranged in a non-orthogonal direction with respect to a direction in which the three output terminals are arranged, and a driver circuit that outputs three actuation signals to the respective three output terminals through the respective three sets of the inductor elements and the ESD protection elements.

(12)

A communication system including:

a transmission device that transmits three actuation signals through a plurality of transmission path groups for each of the transmission path groups, the transmission path groups each including one set of three transmission paths; and a reception device, the transmission device including a plurality of transmission interface sections allocated to the respective transmission path groups, each of the transmission interface sections including three output terminals that are arranged in one line and that are respectively coupled to three transmission paths, three sets of inductor elements and ESD protection elements that are provided for the respective output terminals and are arranged in a non-orthogonal direction with respect to a direction in which the three output terminals are arranged, and a driver circuit that outputs three actuation signals to the respective three output terminals through the respective three sets of the inductor elements and the ESD protection elements.

This application claims the benefit of Japanese Priority Patent Application JP2017-039992 filed with the Japan Patent Office on Mar. 3, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A transmission device comprising:
three output terminals that are arranged in one line and that are respectively coupled to three transmission paths;
three sets of inductor elements and ESD protection elements that are provided for the respective output terminals and are arranged in a non-orthogonal direction with respect to a direction in which the three output terminals are arranged; and
a driver circuit that outputs three actuation signals to the respective three output terminals through the respective three sets of the inductor elements and the ESD protection elements.

2. The transmission device according to claim 1, wherein a plurality of the inductor elements and a plurality of the ESD protection elements included in the three sets are alternately arranged in a direction parallel to a direction in which the three output terminals are arranged.

3. The transmission device according to claim 2, wherein, among three of the inductor elements included in the three sets, a value of an inductance of the inductor element in a middle is larger than values of inductances of the two inductor elements on both sides.

4. The transmission device according to claim 1, wherein, in each of the sets, the inductor element and the ESD protection element are arranged in a normal direction of a support base that supports the three output terminals.

5. The transmission device according to claim 4, wherein, among three of the inductor elements included in the three sets, the inductor element in a middle is disposed further away from the support base than the two inductor elements on both sides.

6. A transmission device comprising
a plurality of transmission interface sections,
each of the transmission interface sections including
three output terminals that are arranged in one line and that are respectively coupled to three transmission paths,
three sets of inductor elements and ESD protection elements that are provided for the respective output terminals and are arranged in a non-orthogonal direction with respect to a direction in which the three output terminals are arranged, and
a driver circuit that outputs three actuation signals to the respective three output terminals through the respective three sets of the inductor elements and the ESD protection elements.

7. The transmission device according to claim 6, wherein a plurality of the inductor elements and a plurality of the ESD protection elements included in the three transmission interface sections are disposed to allow a distance between two of the inductor elements each disposed adjacent to one of the inductor elements and a distance between two of the inductor elements each disposed adjacent to another one of the inductor elements to be substantially equal to each other.

8. The transmission device according to claim 6, wherein a plurality of the inductor elements and a plurality of the ESD protection elements included in the three transmission interface sections are alternately arranged in a direction parallel to a direction in which the three output terminals are arranged.

9. The transmission device according to claim 8, wherein each of the transmission interface sections includes one constant-voltage terminal to which a constant voltage is applied, which is coupled to the driver circuit, and
a plurality of the constant-voltage terminals included in the three transmission interface sections is disposed among an arrangement of a plurality of output terminals included in the three transmission interface sections.

10. The transmission device according to claim 6, wherein each of the transmission interface sections includes one constant-voltage terminal to which a constant voltage is applied, which is coupled to the driver circuit,
a plurality of the inductor elements and a plurality of the ESD protection elements included in the three transmission interface sections are disposed to allow two of the inductor elements to be adjacent to each other and also to allow two of the ESD protection elements to be adjacent to each other, and
a plurality of the constant-voltage terminals included in the three transmission interface sections is disposed among an arrangement of a plurality of output terminals included in the three transmission interface sections, and is also disposed to allow intervals between two of the inductor elements adjacent to each other to be increased.

11. A communication system comprising:
a transmission device that transmits three actuation signals through three transmission paths; and
a reception device,
the transmission device including
three output terminals that are arranged in one line and that are respectively coupled to the three transmission paths,
three sets of inductor elements and ESD protection elements that are provided for the respective output terminals and are arranged in a non-orthogonal direction with respect to a direction in which the three output terminals are arranged, and
a driver circuit that outputs three actuation signals to the respective three output terminals through the respective three sets of the inductor elements and the ESD protection elements.

12. A communication system comprising:
a transmission device that transmits three actuation signals through a plurality of transmission path groups for each of the transmission path groups, the transmission path groups each including one set of three transmission paths; and
a reception device,
the transmission device including a plurality of transmission interface sections allocated to the respective transmission path groups, each of the transmission interface sections including
three output terminals that are arranged in one line and that are respectively coupled to three transmission paths,
three sets of inductor elements and ESD protection elements that are provided for the respective output terminals and are arranged in a non-orthogonal direction with respect to a direction in which the three output terminals are arranged, and
a driver circuit that outputs three actuation signals to the respective three output terminals through the respective three sets of the inductor elements and the ESD protection elements.

\* \* \* \* \*